Sept. 1, 1964   S. W. MacGREGOR   3,146,980
SHOCK PREVENTIVE MOUNTING STRUCTURE
Filed Sept. 14, 1962   2 Sheets-Sheet 2

INVENTOR.
SANDRA W. MacGREGOR
BY *Sidney Magnes*
AGENT

United States Patent Office 3,146,980
Patented Sept. 1, 1964

3,146,980
SHOCK PREVENTIVE MOUNTING STRUCTURE
Sandra W. MacGregor, Bellflower, Calif., assignor to North American Aviation, Inc.
Filed Sept. 14, 1962, Ser. No. 223,711
20 Claims. (Cl. 248—20)

This invention relates to a mounting structure; and more particularly to a mounting structure that protects a sensitive unit from mechanical shock.

Background

In many cases, two bodies are coupled together in such a way that on the occurrence of undue forces, the bodies are freed from each other. One example of this usage is a gear coupled to a shaft; and another example is a body mounted on, or suspended from, a base or a framework. Under given conditions of force, a pin will break, or "shear," to permit the two bodies to separate.

In the past, the so-called "shear pin" that coupled the bodies together has consisted of a material, such as a ceramic or a metal, that ruptured when exposed to a given force or shock.

It is usually desirable that the individual shear pins rupture under exactly the same conditions; otherwise they cannot be substituted for each other, or—if several shear pins are used—the supported body will be released unevenly.

Unfortunately, it is difficult to produce a plurality of shear pins that break under exactly the same conditions. This difficulty is caused in part by slight inhomogeneities of the material of which the pin is formed, and—in the case of brittle materials—by the minute scratches and strains introduced in the forming of the shear pin.

While shear pins are widely used, the instant invention will be described in terms of rigidly supporting a sensitive body, and yet protecting it from extreme shock.

One illustration of this usage may be found in submarines. Most modern-day submarines have a device known as an "auto-navigator," that automatically and continually computes the instantaneous location of the submarine. As may be understood, for precise results it is necessary that the auto-navigator be rigidly fastened to the frame work of the submarine.

However, since the auto-navigator is extremely sensitive, it must be protected from shock.

When a submarine is exposed to a severe shock, it is desirable that the auto-navigator be detached from the shock-subjected framework of the submarine; and be supported instead by a resilient shock-mounting that protects it from the shock to which the submarine proper is being exposed. After the shock has passed, the auto-navigator may be re-mounted; and if it had been properly protected, it will still be operational.

Objects and Drawings

It is therefore the principal object of my invention to provide an improved mounting structure.

Figure 1:
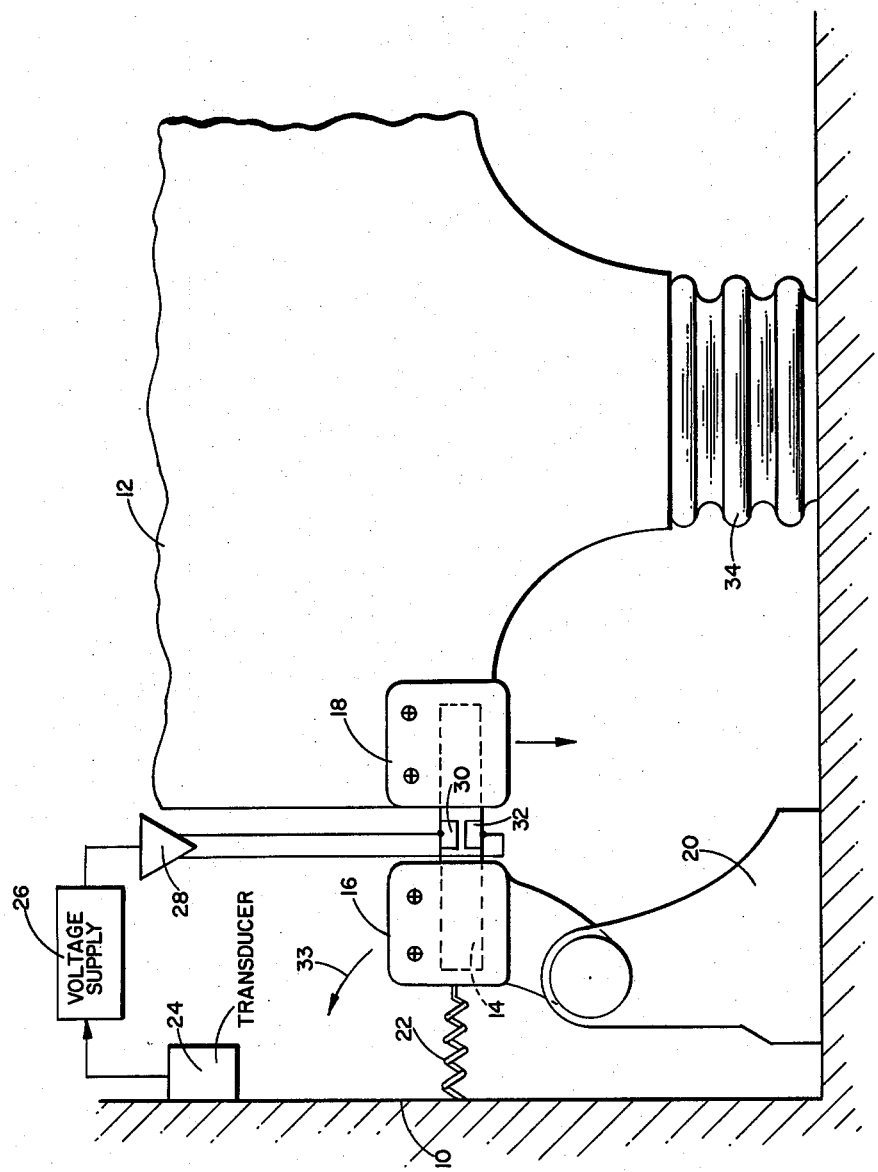

The attainment of this object and others will be realized from the following specification, taken in conjunction with the drawings, of which FIGURE 1 shows my basic inventive concept; and
FIGURES 2–6 show various structures of my novel shear-pin.

Synopsis

My invention contemplates a novel shear pin that is used to mount a body rigidly to a framework or base; the shear pin being formed of piezoelectric material that ruptures when a suitable electrical signal is applied to it. I place a transducer at a convenient location, so that a predetermined force, shock wave, or a shock applied to the base causes the transducer to produce an output signal. This output signal causes a voltage to be applied to the piezoelectric shear pin, and causes it to rupture; thus freeing the sensitive body from the base.

In this way, the body is rigidly supported on the base until a predetermined value of shock or shock wave is received, at which time the sensitive body is transferred to a resilient shock-mount that absorbs the shock, and thus protects the sensitive body.

The theory, principle, and operation of my invention will be disclosed; along with various structures of the shear-pin itself.

Introduction

So-called piezoelectric materials derive their name from their characteristic that, when mechanically distorted by twisting, bending, stretching, etc., they produce a voltage whose magnitude depends upon the distortion. They also have the opposite characteristic, i.e., if a voltage is applied to them they become distorted in a manner depending upon the voltage, its mode of application, the type of piezoelectric material, the shape of the piezoelectric body, etc.

If the voltage becomes too large, the distortion becomes excessive; and the piezoelectric crystal ruptures. In some cases, when the voltage is not large enough to cause rupture, the piezoelectric crystal may become overheated, and mechanically weak.

In the past, piezoelectric materials were carefully guarded against rupture or weakening; whereas my inventive concept purposely causes rupture or weakening of the piezoelectric material.

Description of the Invention

My invention will be understood from a study of FIGURE 1. This shows a base 10, which may be the hull or the framework of a submarine. A sensitive body 12, such as an auto-navigator, is to be rigidly mounted on base 10; but in such a manner that it may be separated from the base when the base is exposed to extreme shock.

I accomplish this result by means of a piezoelectric shear-pin 14 that couples together the base 10 and the sensitive body 12. In one arrangement, the ends of the shear-pin are clamped in suitable clamping devices 16 and 18. Clamping device 18 is rigidly attached to sensitive body 12, while clamping device 16 is pivotally mounted on a supporting structure 20. Clamping device 16 has a spring 22 attached thereto, for reasons which will become apparent from the following description. Of course, other coupling arrangements may be used.

The actuating system comprises a transducer 24 that is fastened to the framework or the hull of the submarine; the output of the transducer being connected to a voltage supply 26, whose output is in turn applied to two electrodes 30 and 32 positioned on the shear-pin 14. If desired an amplifier 28 may be used.

When the output of the transducer is large enough, it may be applied directly to the amplifier; thus obviating the need for the voltage supply 26.

Operation

Assume that a shock wave reaches the submarine. It is sensed by transducer 24, which activates the voltage supply 26 and/or the amplifier 28, whose output is then applied to the electrodes 30 and 32. Thus, an electric field is produced across a portion of each piezoelectric shear-pin 14; this electric field having suitable characteristics to cause simultaneous rupture of all the shear-pins that are supporting the sensitive body 12.

When this happens, spring 22 retracts clamping device 16 as shown by arrow 33, so that the clamping device does not impede the free fall of sensitive body 12. Body 12 therefore falls directly downward, and is caught and supported by a resilient shock mount 34, such as foam rubber, springs, etc. that cushions and cradles the sensitive body against the shock.

My invention will cause the piezoelectric shear-pins to rupture before the mechanical shock reaches them and the sensitive body through the framework 10.

Thus, due to my invention, the sensitive body is even protected against the initial shock that, in the past, was used to rupture the shear-pin.

It is of course desirable that minor shocks should not rupture the shear-pins. This type of protection is readily achieved. For example, the circuit may be so designed that a transducer output smaller than a predetermined value does not actuate the circuit; or else the response of the voltage source and/or amplifier may be such that small transducer signals are ineffective. Alternatively, the transducer may be such that it has a minimal output for small shocks, but a large output for shocks above a predetermined value.

The Shear-Pin

Shear-pins of various materials may be used, these suitable materials including quartz, Rochelle salts, barium titanate, and the compounds known as PZT—several compositions of which are available from the Clevite Manufacturing Company.

Figure 2:
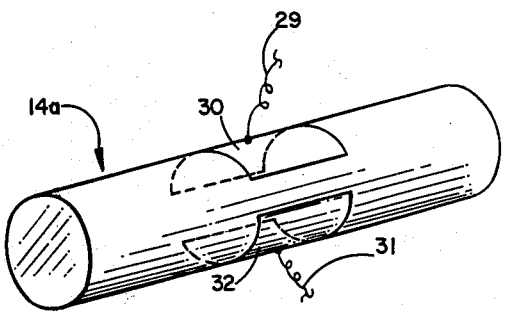

One shear-pin structure 14a, shown in FIGURE 2, may take the form of a cylinder-like structure of suitable diameter to provide the necessary strength. Two saddle-type electrodes 30 and 32 of electrically conductive material are used; each electrode encompassing slightly less than half of the shear pin. When a voltage is applied to the electrodes 30 and 32 by wires such as 29 and 31, the piezoelectric material between the electrodes is ruptured as described above.

This rupture may be the result of either or both of two actions. The applied voltage may, on one hand, cause a mechanical distortion that ruptures the piezoelectric material; or on the other hand the applied voltage may cause a mechanical weakening so that the weight of the supported body is too much for the weakened shear-pin to withstand. While either of these actions may be used to rupture the shear-pin, I prefer that the rupturing be caused by the piezoelectric shattering, rather than depending on the weight of the supported body.

Figure 3:
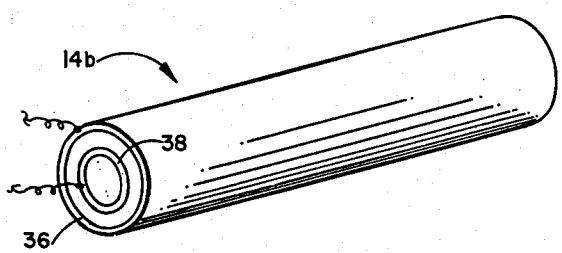

FIGURE 3 shows another type of piezoelectric shear-pin, 14b, this one taking the form of a tube. One electrode 36 is an electrically conductive coating on the outer surface of the tube, and the other electrode 38 is an electrically conductive coating on the inner surface of the tube. Suitable wires apply the previously-mentioned voltages to the electrodes.

Figure 4:
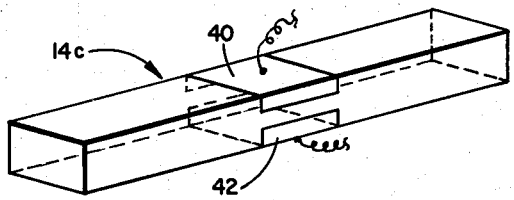

FIGURE 4 shows another type of shear-pin, 14c, this one taking the form of a slab having a square or a rectangular cross section. In this case the conductive electrodes 40, 42 may be coated on opposite surfaces of the slab, or may be in the form of saddles.

Figure 5:
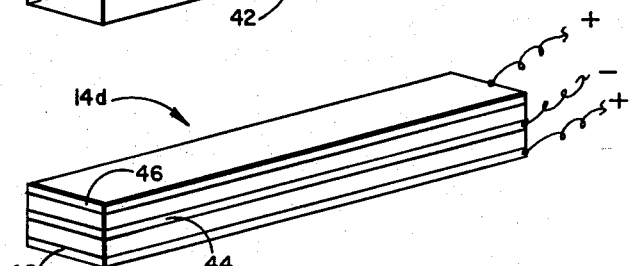

FIGURE 5 shows another form of shear-pin, 14d, this one using the structure known as a "bi-morph." The structure of FIGURE 5 is in actuality two slabs of the type shown in FIGURE 4, bonded together with a layer 44 of brass or other conductive material between them. By applying suitable like-poled voltages through the lead wires to the electrodes 46 and 48, and an oppositely-poled voltage to the layer 44, the structure of FIGURE 5 acts as though two piezoelectric-slabs were in series; and a given voltage produces about twice as much distortion and disruptive force as would be produced by the structure of FIGURE 4.

If desired, more than two layers may be used.

Figure 6:
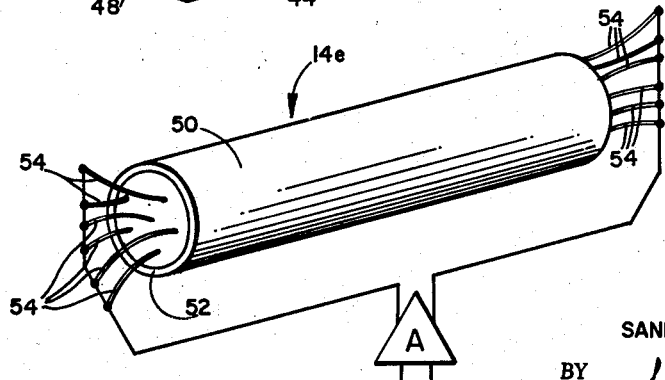

FIGURE 6 shows another shear-pin structure 14e, known as a "multi-morph." This structure comprises a rod 50 of piezoelectric material having a plurality of longitudinally-positioned rods 54 of conductive material, and—if desired—a surrounding conductive electrode 52. When suitable voltages are applied to the conductive rods, or to the rods and the external electrode, rupturing can be produced with a voltage that may be much smaller than in the case of the other structures.

Of course, the shear-pins may be thinned-down, or otherwise shaped to produce desired results.

Discussion

An A.C. voltage is preferable for the following reason. Design parameters are chosen in such a way that the piezoelectric shear-pin will rupture just before the voltage reaches its maximum value. If for some reason rupture does not occur at this time, the cyclic reversals of the A.C. voltage continually re-establish rupture conditions at a high frequency, which may be about 2,000 times per second. Moreover, this continual cyclic reversal progressively heats and weakens the piezoelectric material, so that rupture is assured within a fraction of a second after the voltage is applied.

A piezoelectric shear-pin of a given material, size, shape, etc., will have a "resonant" frequency; and an input voltage having this frequency will produce maximum distortion of the shear-pin. It is therefore preferable that the resonant frequency of the shear-pin be known or measured, and that the input electrical signal have the same frequency.

Alternatively, the electrical signal may have a predetermined frequency, and the shear-pin may be formed of suitable material, size, shape, etc. so that it is resonant at the frequency of the input electrical signal.

This relationship assures that the piezoelectric shear-pin will rupture at a relatively low voltage, which is desirable from a circuitry-design point of view.

As previously indicated, an applied voltage produces a distortion of the piezoelectric material. The distortion-to-voltage relation is at a maximum in the so-called "C" direction of the crystal. Preferably, the shear-pins used in my invention are cut or formed in such a manner that the plane of the C axis is perpendicular to the electrodes. Thus, in FIGURES 2–6, the C axis would be in a plane that is parallel to the ends of the illustrated shear-pins.

In accordance with the teachings of my invention, the term "piezoelectric shear-pin" is thus construed to mean a body of piezoelectric material that may be ruptured by the use of an electrical signal to de-couple or free two or more bodies from each other.

Advantages

It will now be realized that my invention has innumerable advantage over prior-art mounting structures. Firstly, it provides a rigid mounting for ordinary operations, but assures that the sensitive body will be protected from shocks. Secondly, timely rupture of the shear-pin is assured. Thirdly, all of the shear-pins will rupture simultaneously, so that the sensitive unit is lowered evenly to a resilient shock-mount. Fourthly, the sensitive unit is protected from the initial shock that ruptured the prior-art shear-pins. And finally, various types of piezoelectric shear-pins and electric circuitry may be used, depending upon the desired results.

Although the invention has been described and illustrated in detail, it is to be understood that the same is by way of illustration and example only, and is not to be taken by way of limitation; the spirit and scope of this invention being limited only by the terms of the appended claims.

I claim:

1. The process comprising using a piezoelectric material as a shear-pin; and rupturing said piezoelectric shear-pin in response to an electrical signal.

2. The combination comprising:
    a base;
    a body to be supported on said base, but to be freed from said base under specified conditions;
    means, comprising a piezoelectric shear-pin, for supporting said body on said base; and electrical means for rupturing said piezoelectric shear-pin under said specified conditions—whereby said body may be freed from said base.

3. A mounting structure comprising:
a base;
a body to be mounted rigidly on said base for normal operation, and to be freed from said base under specified conditions;
means, comprising a piezoelectric shear-pin for mounting said body on said base; and
electrical means for applying a piezoelectric-material-rupturing-signal to said piezoelectric shear-pin under said specified conditions.

4. A mounting structure comprising:
a base;
a body to be mounted rigidly on said base for normal operation, and to be freed from said base under specified conditions;
means, comprising a piezoelectric shear-pin for mounting said body on said base;
a voltage source; and
means, comprising a transducer that produces an output under said specified conditions, for applying a signal from said voltage source to said piezoelectric shear-pin under said specified conditions.

5. A mounting structure comprising:
a framework;
a body to be rigidly mounted on said framework for normal operation, and to be supported on a resilient shock-mount when said framework is exposed to shock;
a first clamping device mounted on said framework;
a second clamping device mounted on said body;
a piezoelectric shear-pin having one end clamped in said first clamping device, and having another end clamped in said second clamping device;
a pair of electrodes positioned on said piezoelectric shear-pin;
a voltage source; and
means, comprising a transducer mounted on said framework, for applying a signal from said voltage source to said electrodes—whereby said piezoelectric shear-pin may be ruptured when said framework is exposed to shock, to permit said body to be supported by said resilient shock mount, and thus protected from said shock.

6. A first and second element disposed a discrete distance apart, a piezoelectric material rigidly connecting said elements to each other in a relatively shearable location, electrical signal means for causing said piezoelectric material to rupture in response to a predetermined acceleration load on one of said elements.

7. A piezoelectric shear-pin composed of material which renders said pin rupturable in response to an electric signal.

8. A piezoelectric shear-pin composed of material which renders said pin rupturable in response to an electric signal, and a pair of electrodes positioned on said piezoelectric shear-pin whereby a voltage may be applied between said electrodes and across the material of said piezoelectric shear-pin.

9. The combination of claim 8 wherein said piezoelectric shear-pin is cylindrical, and said electrodes are of the saddle-type.

10. The combination of claim 8 wherein said piezoelectric shear-pin is tubular, and said electrodes are coatings on the inner and outer surfaces of said tubular piezoelectric shear-pin.

11. The combination of claim 8 wherein said piezoelectric shear-pin is slab-type, and said electrodes are coatings on opposite surfaces of said slab.

12. The combination of claim 8 wherein said piezoelectric shear-pin is slab-type and said electrodes are conductive saddle-type elements positioned on said piezoelectric shear-pin.

13. A piezoelectric shear-pin of the bi-morph type composed of material which renders said pin rupturable in response to an electric signal.

14. A piezoelectric shear-pin of the bi-morph type composed of material which renders said pin rupturable in response to an electric signal, said pin comprising two slab-like elements of said piezoelectric material having their adjacent surfaces bonded to opposite sides of a layer of conductive material; and
a conductive coating on each outer surface of each of said slab-like elements.

15. A piezoelectric shear-pin of the bi-morph type composed of material which renders said pin rupturable in response to an electric signal, said pin comprising two slab-like elements of said piezoelectric material having their adjacent surfaces bonded to opposite sides of a layer of conductive material; and
a conductive coating on each outer surface of each of said slab-like elements; and
means for applying like-poled voltages to said coatings, and an oppositely-poled voltage to said conductive material.

16. A piezoelectric shear-pin of the multi-morph type composed of material which renders said pin rupturable in response to an electric signal.

17. A piezoelectric shear-pin of the multi-morph type composed of material which renders said pin rupturable in response to an electric signal, comprising,
a body of said piezoelectric material;
a conductive coating on the outer surface of said body; and
a plurality of conductive elements positioned in said body, said elements being spaced from each other and from said conductive coating.

18. A piezoelectric shear-pin of the multi-morph type composed of material which renders said pin rupturable in response to an electric signal, comprising,
a cylindrical body of said piezoelectric material;
a plurality of conductive rod-like elements in said cylindrical body, said rod-like elements being positioned parallel to the axis of said cylindrical body, and spaced from each other and from said conductive coating; and
means for applying voltages to said rod-like elements.

19. A piezoelectric shear-pin of the multi-morph type composed of material which renders said pin rupturable in response to an electric signal, comprising,
a cylindrical body of said piezoelectric material;
a conductive coating on the outer surface of said body;
a plurality of conductive rod-like elements in said cylindrical body, said rod-like elements being positioned parallel to the axis of said cylindrical body, and spaced from each other and from said conductive coating; and
means for applying selected polarity voltages to selected said rod-like elements and said conductive coating.

20. The combination comprising,
a base;
a body to be supported on said base, but to be freed from said base under specified conditions; and
means, comprising a piezoelectric shear-pin composed of material which renders said pin rupturable in response to an electric signal, for supporting said body on said base.

References Cited in the file of this patent

UNITED STATES PATENTS

| | | |
|---|---|---|
| 1,610,414 | Bernard | Dec. 14, 1926 |
| 2,507,636 | Kistler | May 16, 1950 |
| 2,633,543 | Howatt | Mar. 31, 1953 |
| 2,665,101 | Janos | Jan. 4, 1954 |
| 2,900,536 | Palo | Aug. 18, 1959 |
| 2,964,272 | Olson | Dec. 13, 1960 |